Nov. 27, 1923.

R. ALLEN 1,475,772

PISTON OR PISTON VALVE

Filed March 2, 1920   8 Sheets-Sheet 1

Inventor
Robert Allen
by
Attorneys

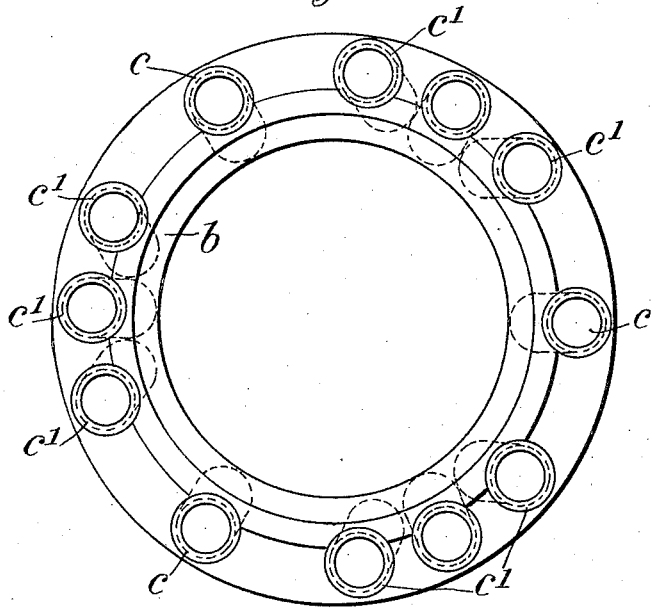
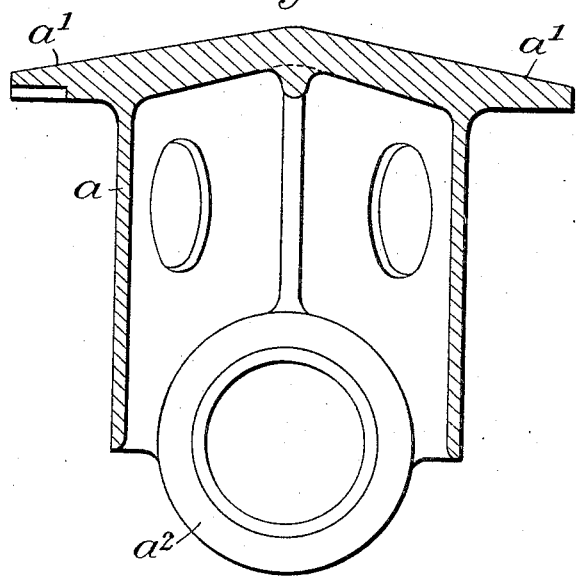

Inventor
Robert Allen

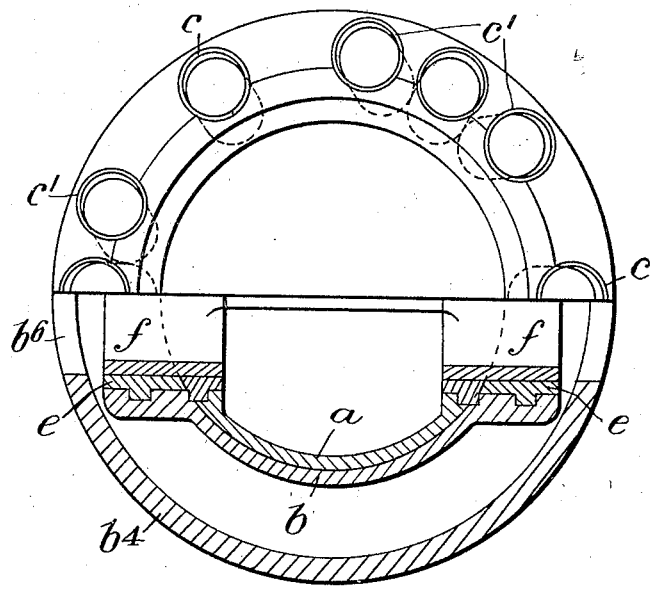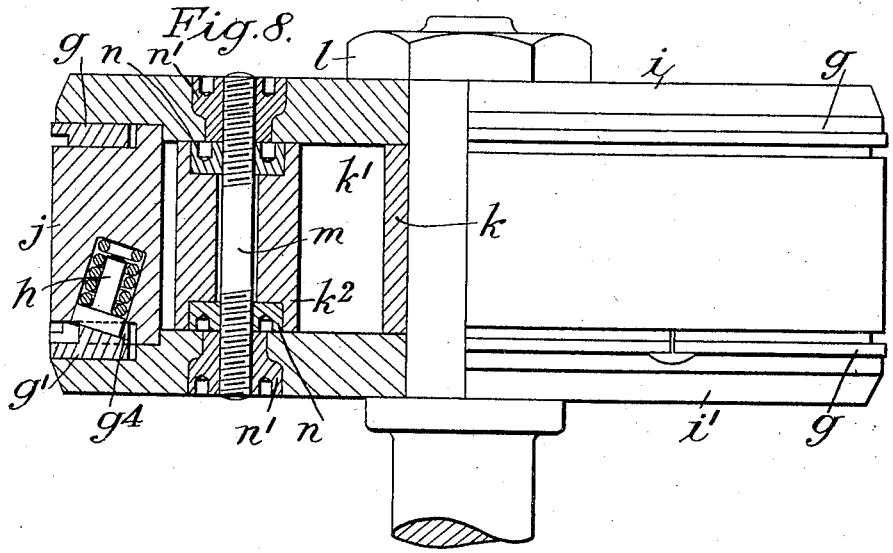

Nov. 27, 1923.

R. ALLEN 1,475,772

PISTON OR PISTON VALVE

Filed March 2, 1920

Inventor
Robert Allen
by H. B. Wilson & Co.
Attorneys

Nov. 27, 1923.

R. ALLEN 1,475,772

PISTON OR PISTON VALVE

Filed March 2, 1920

Inventor
Robert Allen
by
Attorneys

Nov. 27, 1923.  R. ALLEN  1,475,772
PISTON OR PISTON VALVE
Filed March 2, 1920   8 Sheets-Sheet 7

Inventor
Robert Allen
By H. B. Wilson & Co.
Attorneys

Patented Nov. 27, 1923.

1,475,772

UNITED STATES PATENT OFFICE.

ROBERT ALLEN, OF WOODCOTE, NEAR READING, ENGLAND.

PISTON OR PISTON VALVE.

Application filed March 2, 1920. Serial No. 362,707.

*To all whom it may concern:*

Be it known that I, ROBERT ALLEN, a subject of the King of Great Britain and Ireland, and a resident of Chiltern Rise, Woodcote, near Reading, county of Berkshire, England, have invented certain new and useful Improvements in Pistons or Piston Valves, of which the following is a specification.

This invention relates to pistons in which packing rings of the segmental type are expanded by springs or spring plungers so arranged in relation to the packing that the force exerted by each spring is divided into radial and axial pressure components and has for its object to promote the free action of the packing rings, and generally to effect such improvements as shall render the pistons highly efficient and economical in use.

In the accompanying drawings,

Fig. 3 is a plan of the same.

Figs. 4 and 5 are sectional elevation and inverted sectional plan respectively of the inner member of the piston body.

Fig. 7 is a half plan of the outer member of the piston body and a half sectional plan taken at 7—7 Fig. 6.

Figs. 8 and 9 are respectively an elevation partly in section and a plan partly in section illustrating another form of built up piston constructed according to this invention.

Referring to Figs. 1 to 5 which show a piston for an internal combustion engine it will be seen that the piston body comprises an inner tubular member $a$ with a flanged head $a^1$ and an outer tubular member or sleeve $b$ fitted with inclined pockets $c\ c^1$ for the reception of springs $d\ d^1$. Instead of being formed separately as shown the pocket $c\ c^1$ may be cast integral with the sleeve $b$. As the sleeve $b$ is readily removable from the member $a$ the springs can be easily inserted in the pockets but provision may be made for inserting springs without removing the sleeve as will be described hereinafter. On the inner and outer members $a\ b$ bosses $a^2\ b^2$ are formed for the gudgeon pin bushes $e$ which are preferably cast in position if made of aluminium, aluminium alloy or soft metal, case hardened linings $f$ flanged on the inner ends being provided and serving to position the sleeve $b$ on the inner member $a$. Between the flanged head $a^1$ of the inner member $a$ and the pocketed end of the outer member or sleeve $b$ is the seating groove for the packing ring $g$. The ring $g$ is of segmental type the ends of the segments being undercut to form wedge-shaped spaces at the joints in which expanding wedges or pieces $g^1$ engage, these wedges being seated in radial recesses $g^2$ formed in the flange head $a^1$ of the member $a$ adjacent to the ring seating groove.

As shown the springs $d$ located in the pockets $c$ act on the wedges whilst similar springs $d^1$ located in the pockets $c^1$ act directly on integral wedge shaped projections $g^3$ on the packing ring segment the projections of each segment being parallel to a radial line at the center of said segment.

Figure 1:
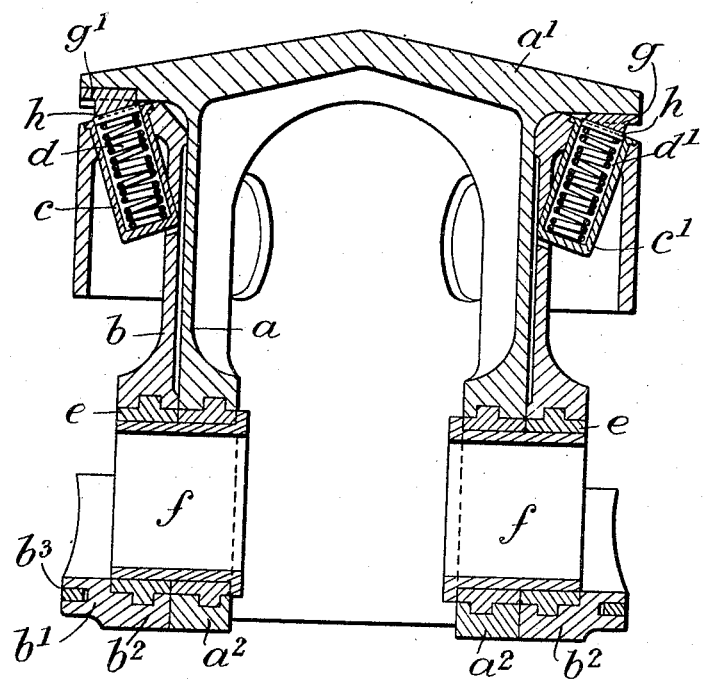
Fig. 1 is a sectional elevation of a piston constructed according to this invention and comprising two main body parts or members one fiting over the other.
Figure 2:
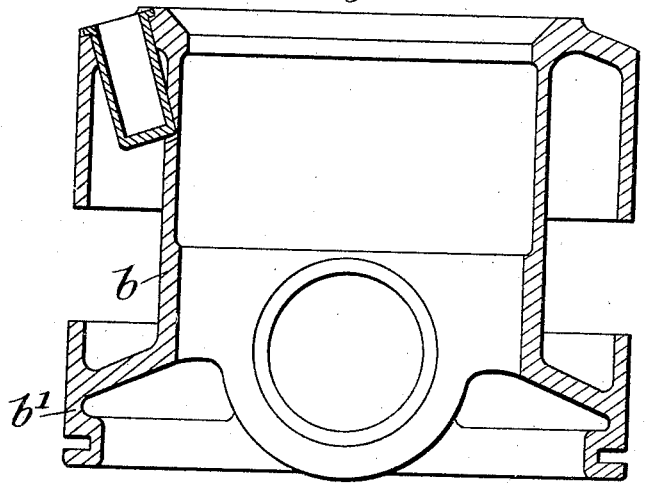
Fig. 2 is a sectional elevation of the outer member of the piston.
Figure 5:
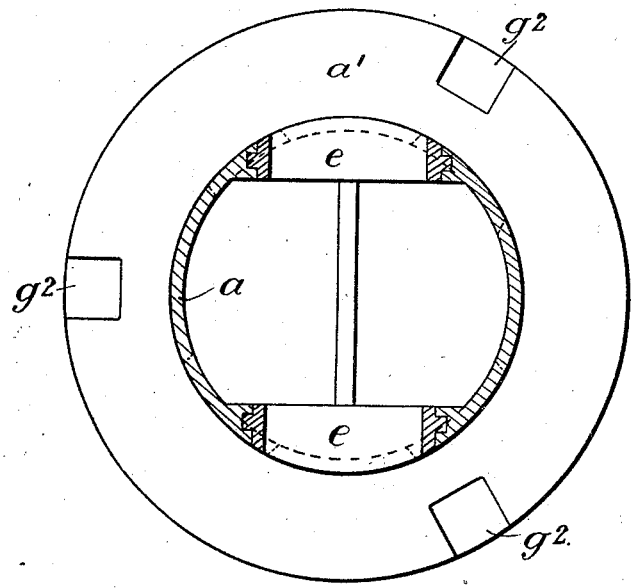
Figure 14:
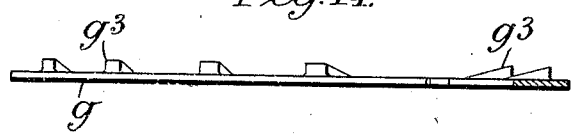
Figs. 14 and 15 are detail views illustrating in elevation and plan one form of packing ring constructed according to this invention.
Figure 16:
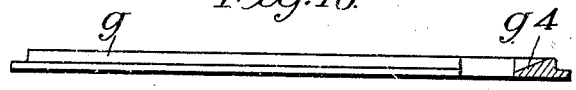
Figs. 16 and 17 are similar views to Figs. 14 and 15 showing an alternative construction of packing ring.
Figure 15:
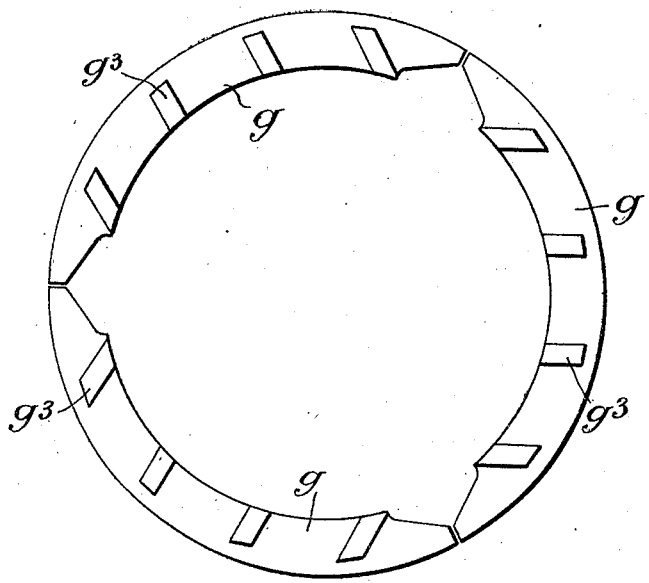
Figure 17:
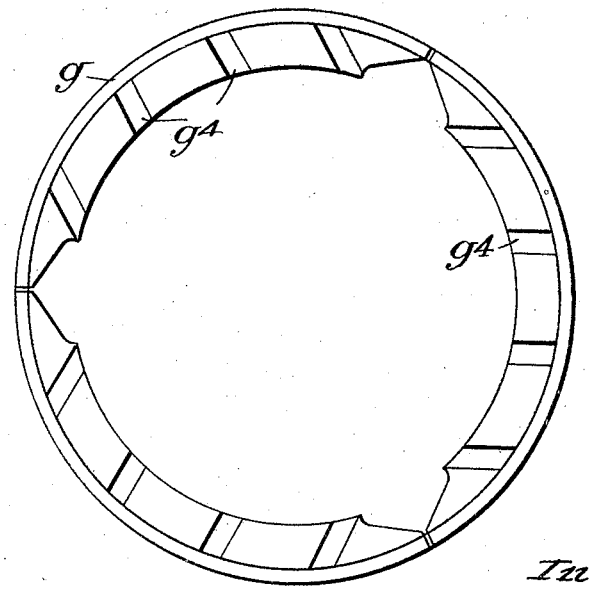

The form and disposition of the projections $g^3$ on the ring $g$ is clearly illustrated in Figs. 14 and 15, but it will be understood that the number of the projections may vary. In some cases the projections $g^3$ may be replaced by wedge shaped recesses $g^4$ as shown in Figs. 16 and 17 the object in both cases being to provide suitable parallel surfaces or tracks for the contact of the spring members as hereinbefore described. If desired the springs $d$ or $d^1$ may each be made of short lengths superimposed upon one another as illustrated to enable them to be got out through the ring seating space when necessary without dismounting the outer sleeve $b$ of the piston. Plungers or discs $h$ located in the outer ends of the pockets $c\ c^1$ transmit the pressure of the springs to the packing rings and their chokes and when operating against projections $g^3$ the plungers may be grooved slightly for the engagement of the projections. In constructing the piston body any suitable metal may be employed but the outer member $b$ could be made of aluminium if desired and the inner member $a$ of steel. In Figs. 1 and 2 an integral rim portion $b^1$ on the outer member $b$ is grooved to receive a scraper ring $b^3$.

Figure 6:
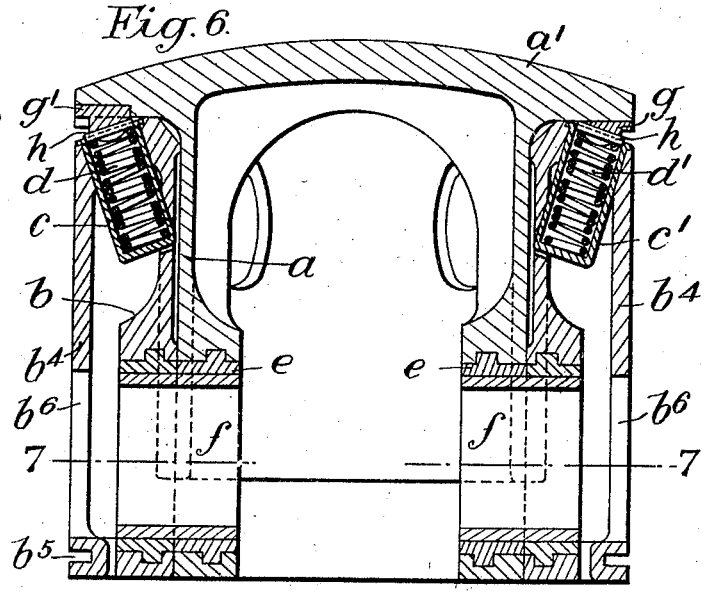
Fig. 6 is a similar view to Fig. 1 illustrating a slightly modified form of construction.

In the slightly modified form of construction shown in Figs. 6 and 7 the outer member $b$ of the piston body is formed with an outer shirt or trunk portion $b^4$ having a recess or seating $b^5$ for a scraper ring and openings $b^6$ opposite the ends of the gudgeon pin. The outside diameter of the greater part of this trunk may be such as to leave an appreciable clearance between the trunk and cylinder or the trunk may be freely perforated to reduce the area in contact with the cylinder. In other respects the piston is similar in construction to that shown in Figs. 1 to 5, the corresponding parts being designated by the same reference characters.

Figure 9:
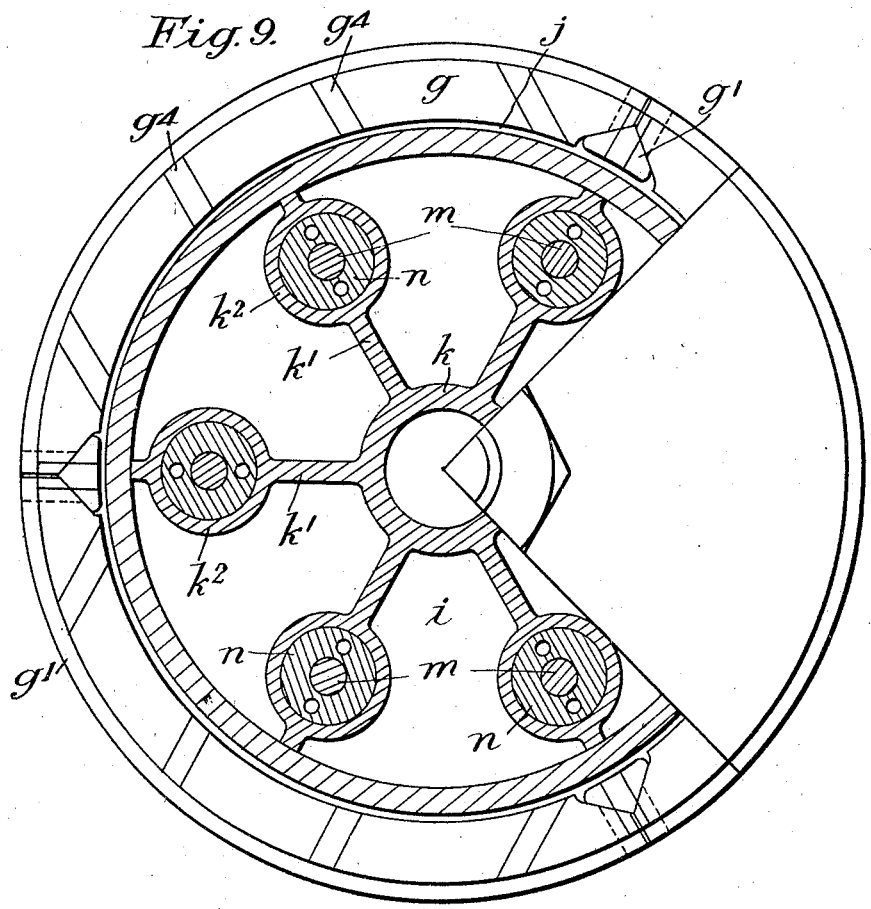

Referring to Figs. 8 and 9 which show a steam piston of the box type the piston body is built up, of two end plates $i$ preferably of highly polished aluminium, a centre boss $k$ with integral webs $k^1$ radiating therefrom, and an annular seating body or ring $j$ formed with annular recesses for packing rings $g$ and inclined pockets for the spring plungers $h$. A nut $l$ secures the piston in position on the rod holding the end plates firmly against the boss whilst stud bolts $m$ are passed through bosses or enlargements $k^2$ on the webs $k^1$ and secured by pairs of nuts $n$ $n^1$ screwed in flush with the end surfaces of the bosses $k^2$ and plates $i$ respectively. The packing rings $g$ are of the type shown in Figs. 16 and 17 both the ring segments and the chokes or wedges $g^1$ located at the joints of the rings having wedge grooves $g^4$ for the engagement of the spring plungers $h$.

Figure 10:
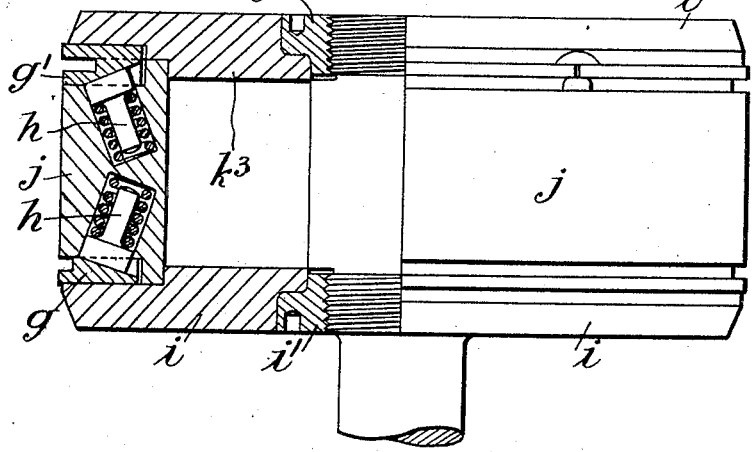
Fig. 10 is a similar view to Fig. 8 illustrating a modified form of construction.
Figure 11:
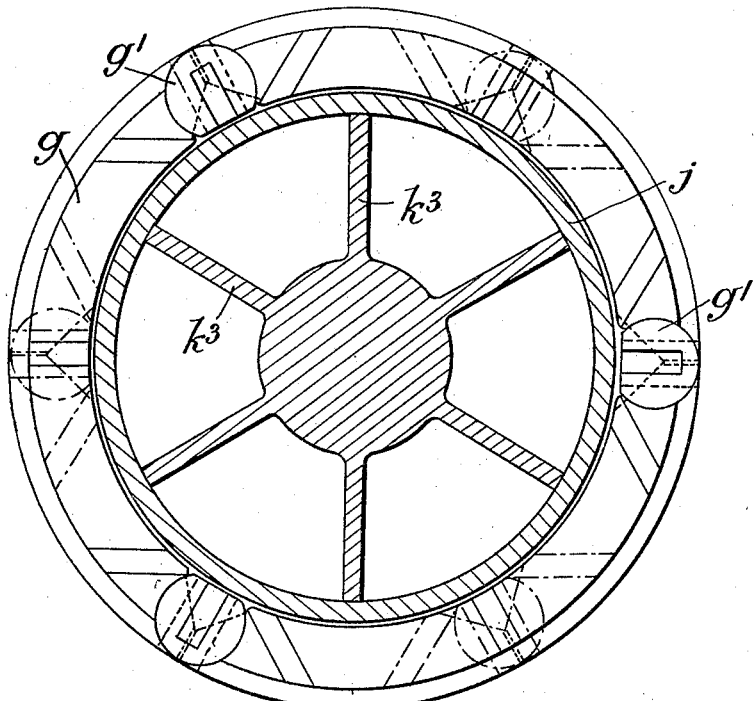
Fig. 11 is a sectional plan of the piston shown in Fig. 10 with one end plate removed.

In the modified box type of piston illustrated in Figs. 10 and 11 radial webs $k^3$ are forged solid with the piston rod and the end plates $i$ are held in position by nuts $l^1$ screwed on the rod and entering recesses in the end faces of the piston so as to lie flush therewith. The packing rings $g$ and choke pieces $g^1$ have grooves or tracks for the engagement of the plungers $h$. Apart from the grooving feature the choke pieces shown in Figs. 10 and 11 are of the type described in my prior British Patent No. 11,480 of 1913.

Figure 12:
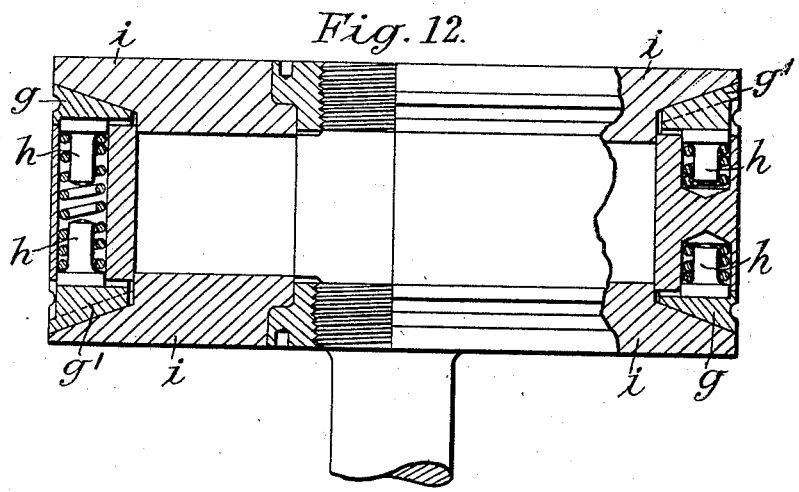
Figs. 12 and 13 are similar views to Figs. 10 and 11 illustrating a further modified form of construction.
Figure 13:
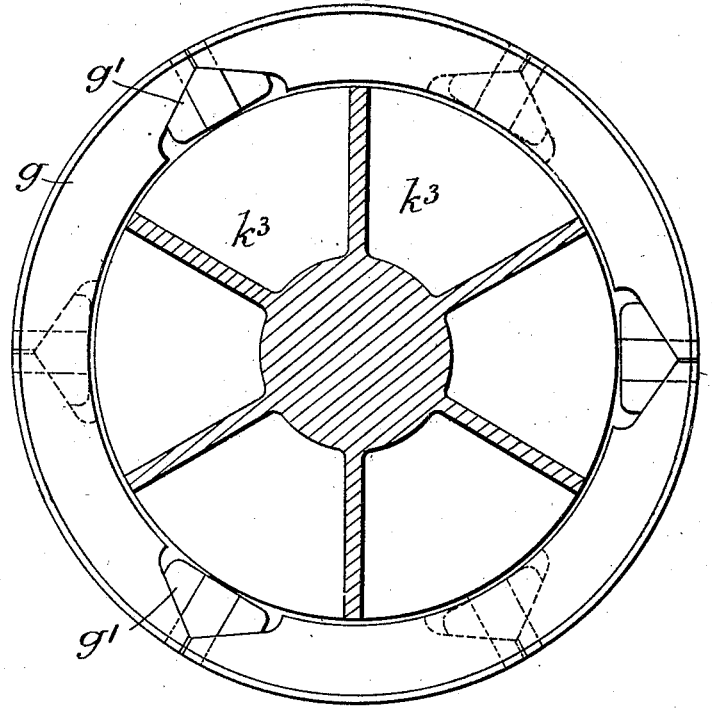

In some cases the pressure faces or tracks of packing rings $g$ and the adjacent sides of their recesses in the end plates $i$ are inclined as shown in Figs. 12 and 13 the choke pieces or wedges $g^1$ having similarly inclined faces, while the faces acted on by the expanding plungers $h$ lie in parallel transverse planes so that the plungers being normal to these faces are parallel with the axis of the piston.

Different forms of piston constructions herein disclosed, form no part of the present invention and are included in the application merely to clearly illustrate the manner of using the improved spring expanded ring in connection with different types of pistons.

I claim:—

1. The combination with a piston, a segmental ring carried thereby, and a plurality of springs acting on the ring segments; of a plurality of tracks on each segment all parallel to a radial line midway between the ends of the segment, said tracks having faces oblique to the piston axis and disposed in parallel planes; said oblique faces being active in conjunction with said springs to force said segments radially outward.

2. In combination, a piston having a ring groove, a segmental ring in said groove, a plurality of tracks on each ring segment, all parallel to a radial line midway between the ends of the segment, said tracks having faces oblique to the piston axis and positioned in parallel planes; said piston being provided with oblique pockets at right angles to said oblique faces; and spring devices in said pockets acting against said oblique faces to force said segments radially outward.

3. The combination with a piston, a segmental ring carried thereby and springs positioned longitudinally of the piston and acting on said segments; of tracks on said sections taking the directions of radial lines midway between the ends of said segments, said tracks having faces oblique to the piston axis; said oblique faces being active in conjunction with said springs to force said segments radially outward.

In testimony whereof he has affixed his signature.

ROBERT ALLEN.